(12) United States Patent
Pozzi et al.

(10) Patent No.: US 12,391,384 B2
(45) Date of Patent: Aug. 19, 2025

(54) METHODS, SYSTEMS, AND DEVICES FOR A SEAT FOR A VEHICLE

(71) Applicant: SUPERNAL, LLC, Washington, DC (US)

(72) Inventors: Alexander Pozzi, Carlsbad, CA (US); John Krsteski, Irvine, CA (US)

(73) Assignee: Supernal, LLC, Washington, DC (US)

( * ) Notice: Subject to any disclaimer, the term of this patent is extended or adjusted under 35 U.S.C. 154(b) by 0 days.

(21) Appl. No.: 18/222,416

(22) Filed: Jul. 14, 2023

(65) Prior Publication Data

US 2024/0017831 A1    Jan. 18, 2024

Related U.S. Application Data

(60) Provisional application No. 63/368,594, filed on Jul. 15, 2022.

(51) Int. Cl.
  *B64D 11/06*      (2006.01)
(52) U.S. Cl.
  CPC ............................. *B64D 11/0601* (2014.12)

(58) Field of Classification Search
  CPC .. B64D 11/0601; B64D 11/0636; B60N 2/91; B60N 2/01; B60N 2/005; B60N 2/012
  See application file for complete search history.

(56) References Cited

U.S. PATENT DOCUMENTS

| | | | |
|---|---|---|---|
| 2001/0024056 A1* | 9/2001 | Romca | B64D 11/0636 |
| | | | 297/188.04 |
| 2017/0088267 A1* | 3/2017 | Dowty | B64D 11/0606 |
| 2017/0240283 A1* | 8/2017 | Dowty | B64D 11/0604 |
| 2019/0039712 A1* | 2/2019 | Moore | B64C 1/1423 |
| 2020/0047641 A1* | 2/2020 | D'Eramo | B64D 11/0601 |

* cited by examiner

*Primary Examiner* — Ashesh Dangol
(74) *Attorney, Agent, or Firm* — McDonnell Boehnen Hulbert & Berghoff LLP

(57) ABSTRACT

The present disclosure describes a seating assembly including a frame, the frame including two rear supports, two side supports, and two front supports, two passenger seating areas, each passenger seating area including a horizontal seating surface and a vertical seating surface disposed on a respective rear support, a console disposed on a respective side support, and a footrest surface disposed on a respective front support, and a divider positioned between the two passenger seating areas.

19 Claims, 12 Drawing Sheets

METHODS, SYSTEMS, AND DEVICES FOR A SEAT FOR A VEHICLE

CROSS-REFERENCE TO RELATED APPLICATION

The present application claims priority to provisional U.S. Application No. 63/368,594 filed Jul. 15, 2022, the contents of which are hereby incorporated by reference in its entirety.

TECHNICAL FIELD

The present disclosure relates to seats, seat backs, seat frames, and seat shrouds in vehicle seating and ways in which such seating can be accommodated such that the user and/or sitter is able to make optimal use of space while being provided with privacy, comfort, additional foot, leg, and arm support, and entertainment and accessory accommodations.

BACKGROUND

Seating assemblies and configurations in certain vehicles used to transport people, goods, or cargo do not allow for optimal use of space while prioritizing passenger comfort. Many times, seats are rigid, immobile, non-adjustable, and uncomfortable. Such seats do not allow for adequate leg and arm support and do not have appropriate reclining adjustability. Further, seating assemblies tend to be heavy, lowering the power efficiency (e.g., fuel efficiency or battery life) and speed capabilities of a vehicle. Therefore, there exists a need to optimize space, prioritize passenger comfort, and promote vehicle speed and efficiency.

SUMMARY

Different from conventional solutions, the disclosed seat apparatus solves the above problems by providing a unique seat for a vehicle that allows passenger(s) to place belongings, clothing, garments, and/or electronic device(s) in a convenient and ergonomic-friendly manner thereby allowing for optimal use of the seat space, ergonomic-friendly adjustment, comfort, and entertainment and accessory accommodations for the passenger(s).

The present disclosure describes implementations that relate to a seating assembly and variations thereof. The embodiments of the seating assemblies and aerial vehicle disclosed herein may be used to replace and/or supplement conventional seating assemblies for vehicles such as aircraft (e.g., airplanes, helicopters, airships, vertical takeoff and landing (VTOL) vehicles, unmanned aerial vehicles, drones, and hot air balloons), ground vehicles (e.g., cars, trucks, buses), rail vehicles (e.g., trains, unmanned trains), or water vehicles (e.g., boats, submersibles).

In a first example embodiment, the present disclosure describes a seating assembly including a frame, the frame including two rear supports, two side supports, and two front supports, two passenger seating areas, each passenger seating area including a horizontal seating surface and a vertical seating surface disposed on a respective rear support, a console disposed on a respective side support, and a footrest surface disposed on a respective front support; and a divider positioned between the two passenger seating areas.

In a further example embodiment, the present disclosure describes a seating assembly for a vehicle, the seating assembly including a passenger seating assembly. The passenger seating assembly includes a frame, the frame having two rear supports, two side supports, and two front supports, at least two passenger seating areas, each passenger seating area comprising a horizontal seating surface and a vertical seating surface disposed on a respective rear support, a console disposed on a respective side support, and a footrest surface disposed on a respective front support, and a passenger divider positioned between the at least two passenger seating areas. The seating assembly further includes an operator seating area and an operator divider disposed between the at least two passenger seating areas and the operator seating area.

In a further example embodiment, the present disclosure describes an aerial vehicle including a body, a plurality of wings extending from the body, a plurality of rotors, and a tail. The body of the aerial vehicle includes a cabin, the cabin including a seating assembly that includes a frame including two rear supports, two side supports, and two front supports, two passenger seating areas, each passenger seating area including a horizontal seating surface and a vertical seating surface disposed on a respective rear support, a console dispose don a respective side support, and a footrest surface disposed on a respective front support, and a divider positioned between the two passenger seating areas.

The foregoing summary is illustrative only and is not intended to be in any way limiting. In addition to the illustrative aspects, implementations, and features described above, further aspects, implementations, and features will become apparent by reference to the drawings and the following detailed description.

BRIEF DESCRIPTION

Figure 2A:
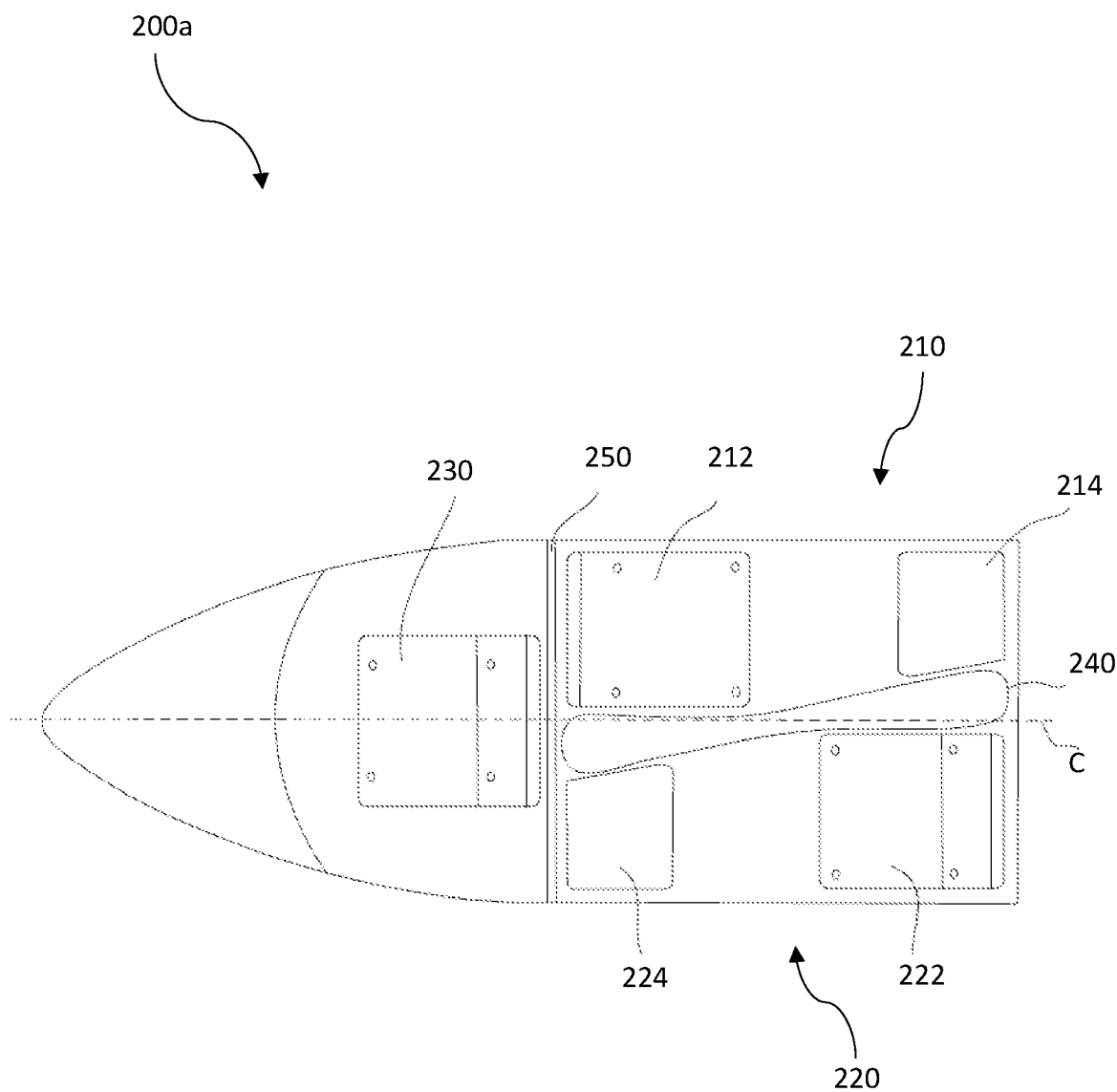
FIG. 2A illustrates an exemplary configuration of a seating assembly according to an embodiment of the present invention.
Figure 2B:
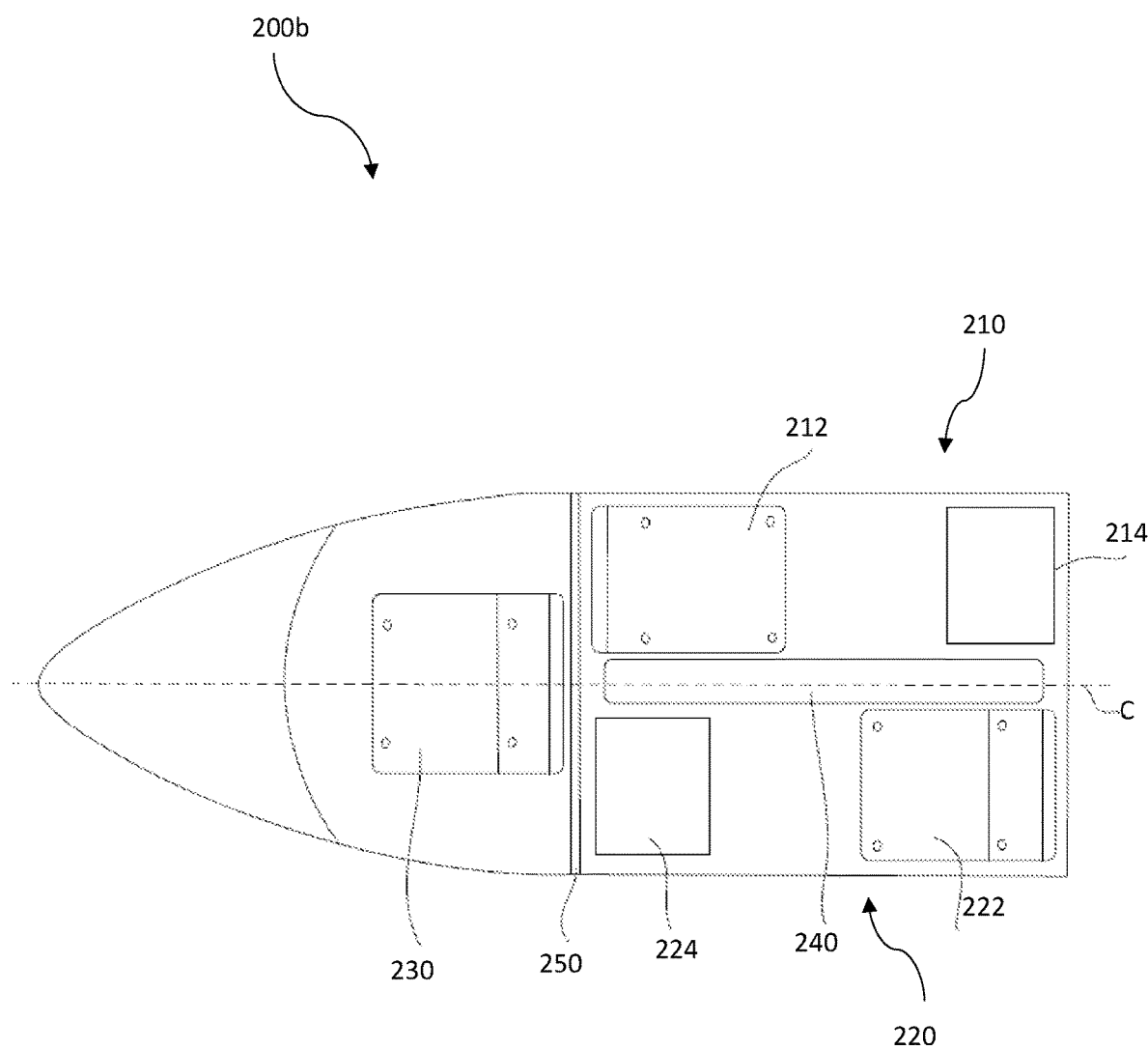
FIG. 2B illustrates an exemplary configuration of a seating assembly according to an embodiment of the present invention.
Figure 2C:
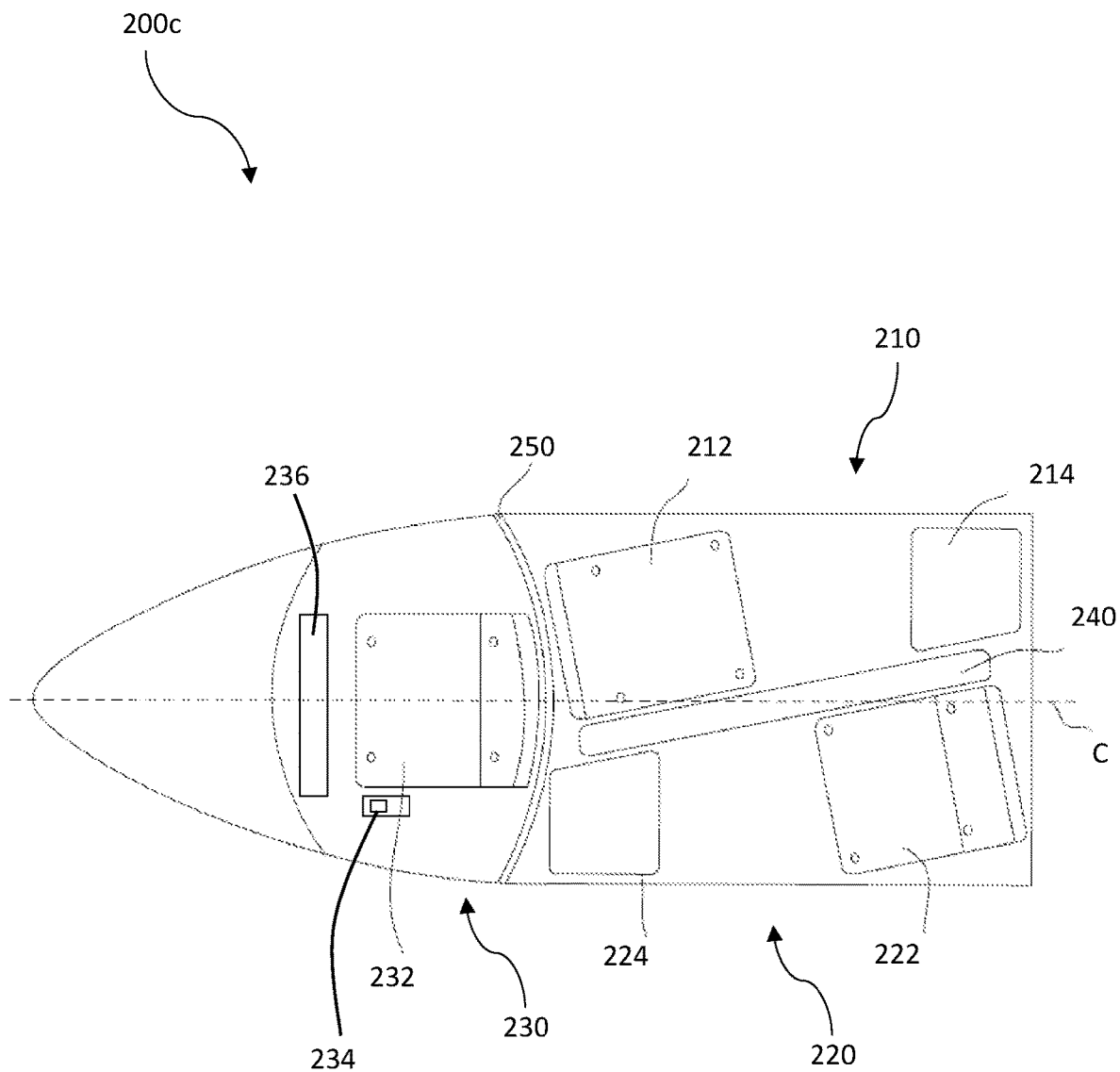
Figure 3A:
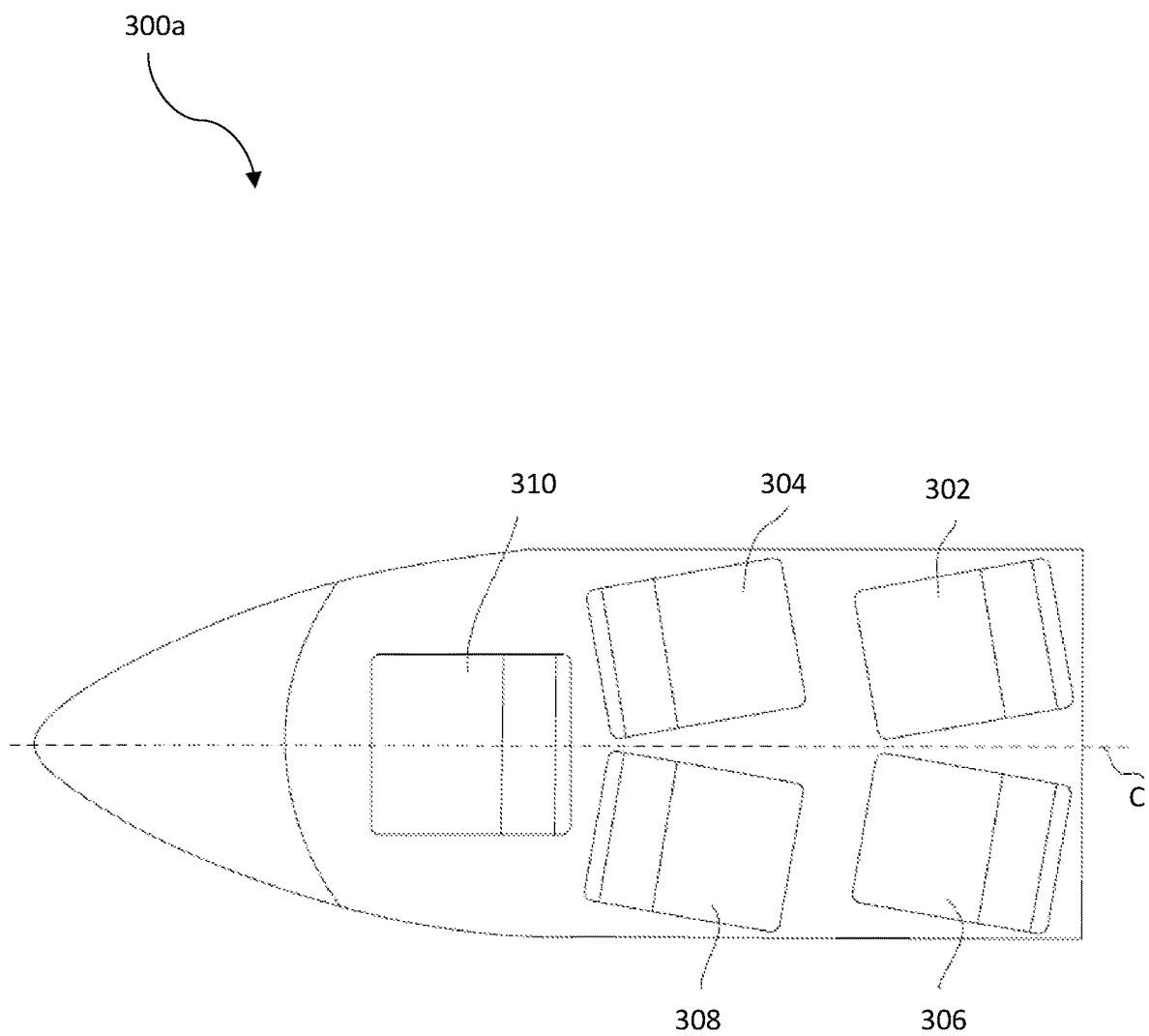
Figure 3B:
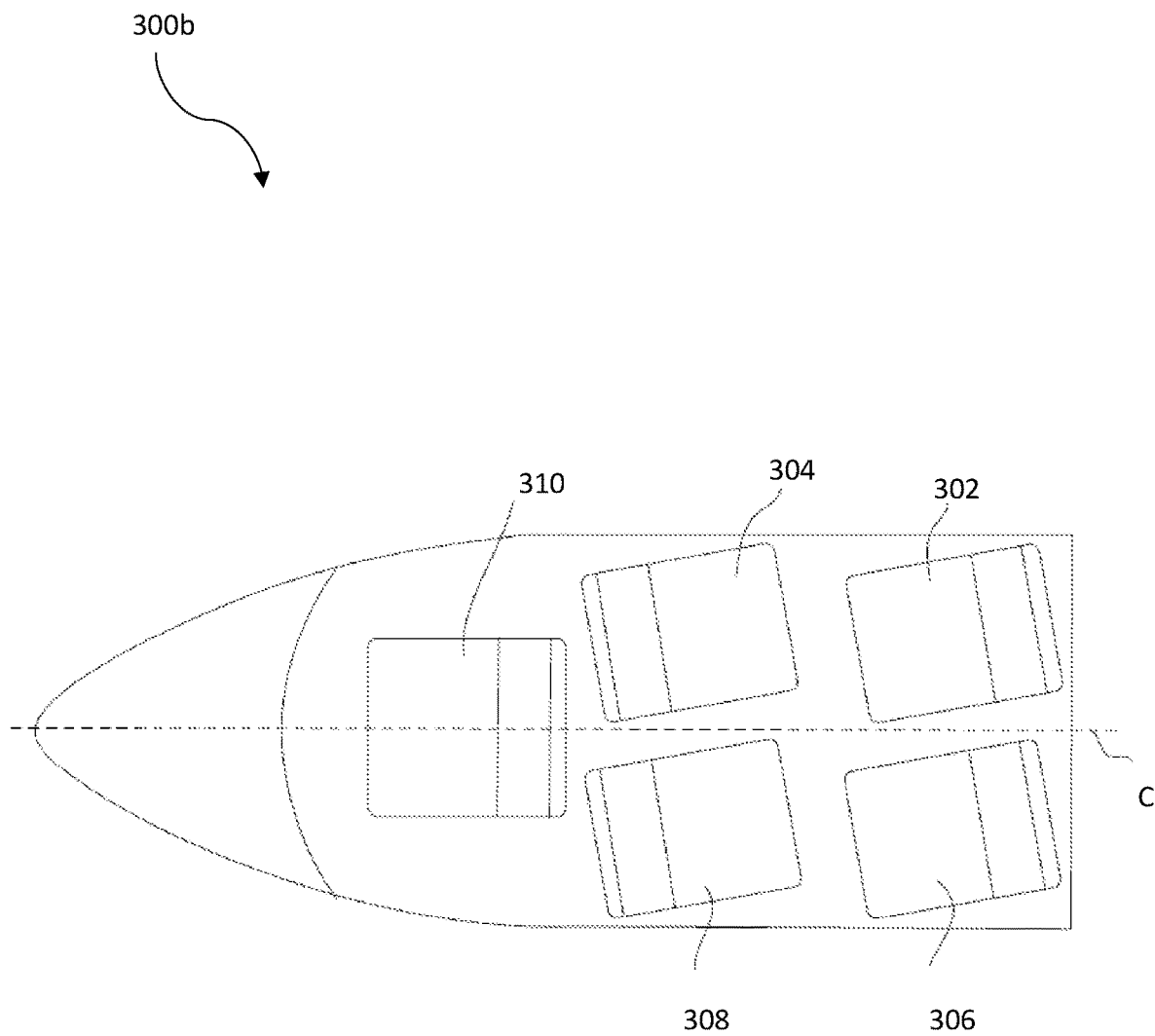
Figure 3C:
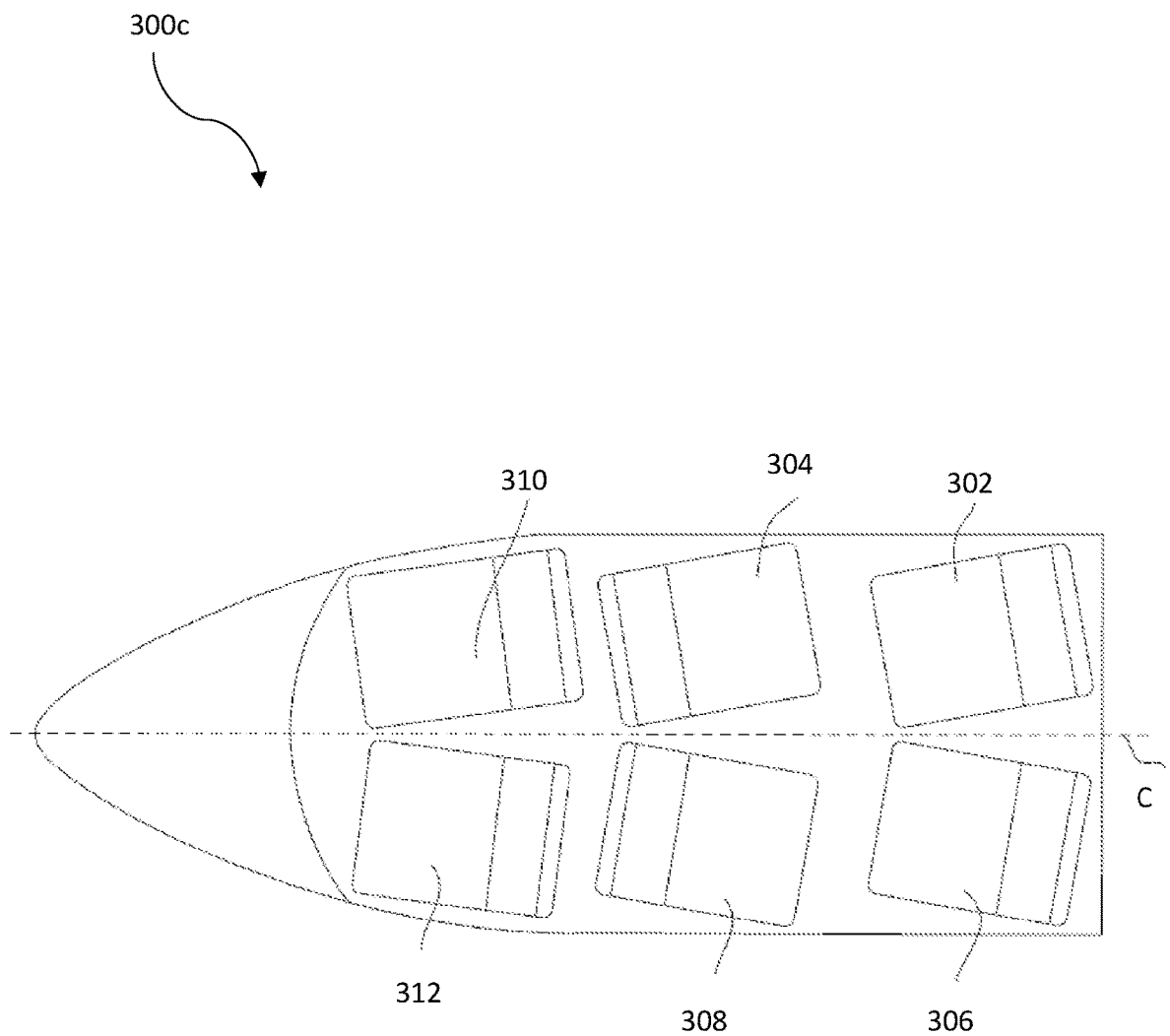
Figure 4:
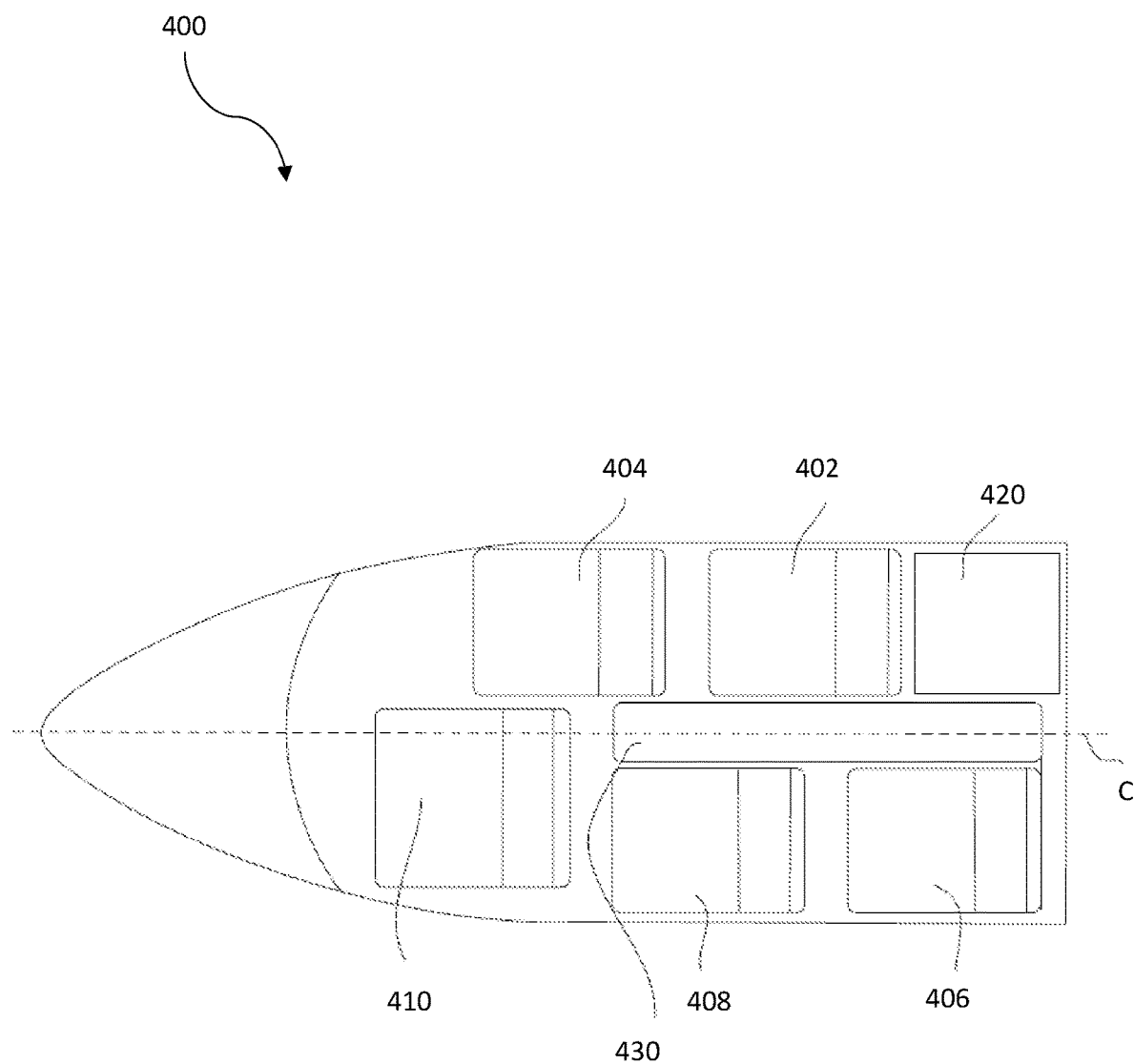

FIG. 2C illustrates an exemplary configuration of a seating assembly according to an embodiment of the present invention FIG. 3A illustrates an exemplary configuration of a seating assembly according to an embodiment of the present invention FIG. 3B illustrates an exemplary configuration of a seating assembly according to an embodiment of the present invention FIG. 3C illustrates an exemplary configuration of a seating assembly according to an embodiment of the present invention FIG. 4 illustrates an exemplary configuration of a seating assembly according to an embodiment of the present invention.

Figure 5A:
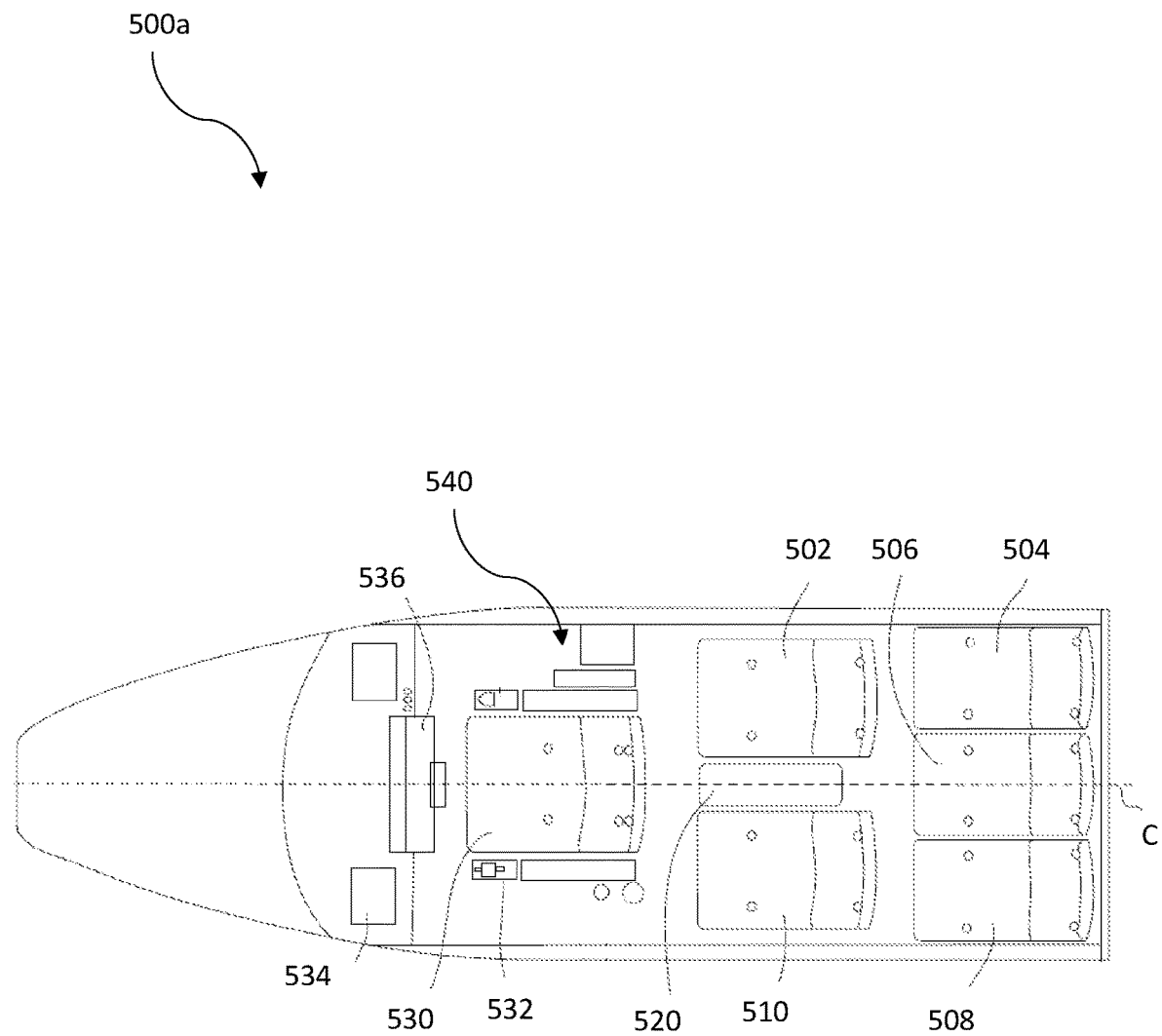

FIG. 5A illustrates an exemplary configuration of a seating assembly according to an embodiment of the present invention.

Figure 5B:
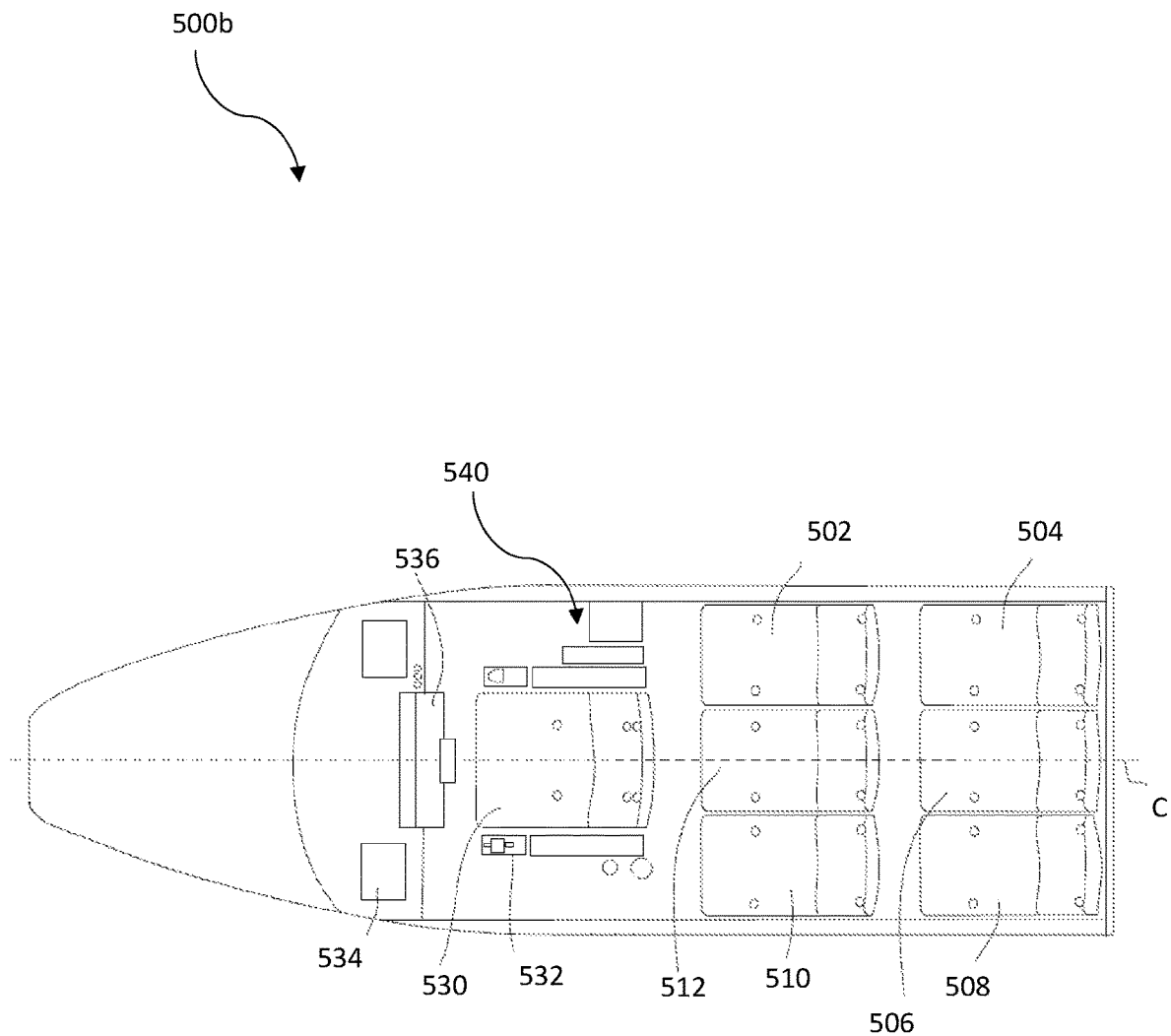

FIG. 5B illustrates an exemplary configuration of a seating assembly according to an embodiment of the present invention.

Figure 6:
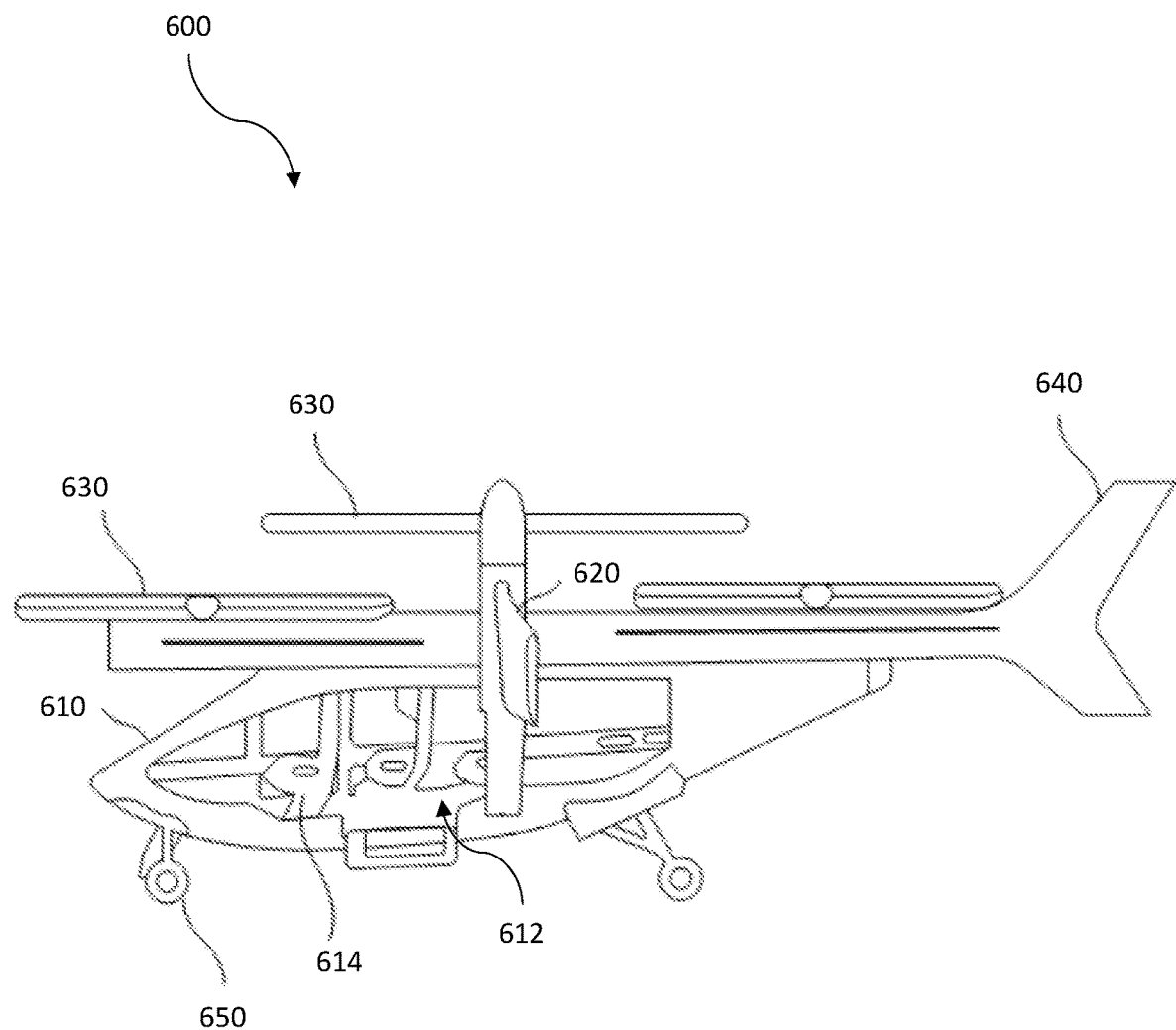

FIG. 6 illustrates an exemplary aerial vehicle according to embodiment of the present invention.

DETAILED DESCRIPTION

Disclosed herein are examples of assemblies and arrangements of a seating assembly which may be utilized in vehicles, such as aircraft (e.g., airplanes, helicopters, airships, VTOL vehicles, unmanned aerial vehicles, drones, and hot air balloons), ground vehicles (e.g., cars, trucks, buses), rail vehicles (e.g., trains, unmanned trains), or water vehicles (e.g., boats, submersibles).

Embodiments described herein may include a seating assembly including a frame having at least two rear supports, at least two side supports, and at least two front supports. The seating assembly may also include at least two passenger seating areas, each passenger seating area having a horizontal seating surface and a vertical seating surface disposed on a respective rear support, a console disposed on a respective side support, and a footrest surface disposed on a respective front support, and a divider positioned between the at least two passenger seating areas.

Figure 1A:
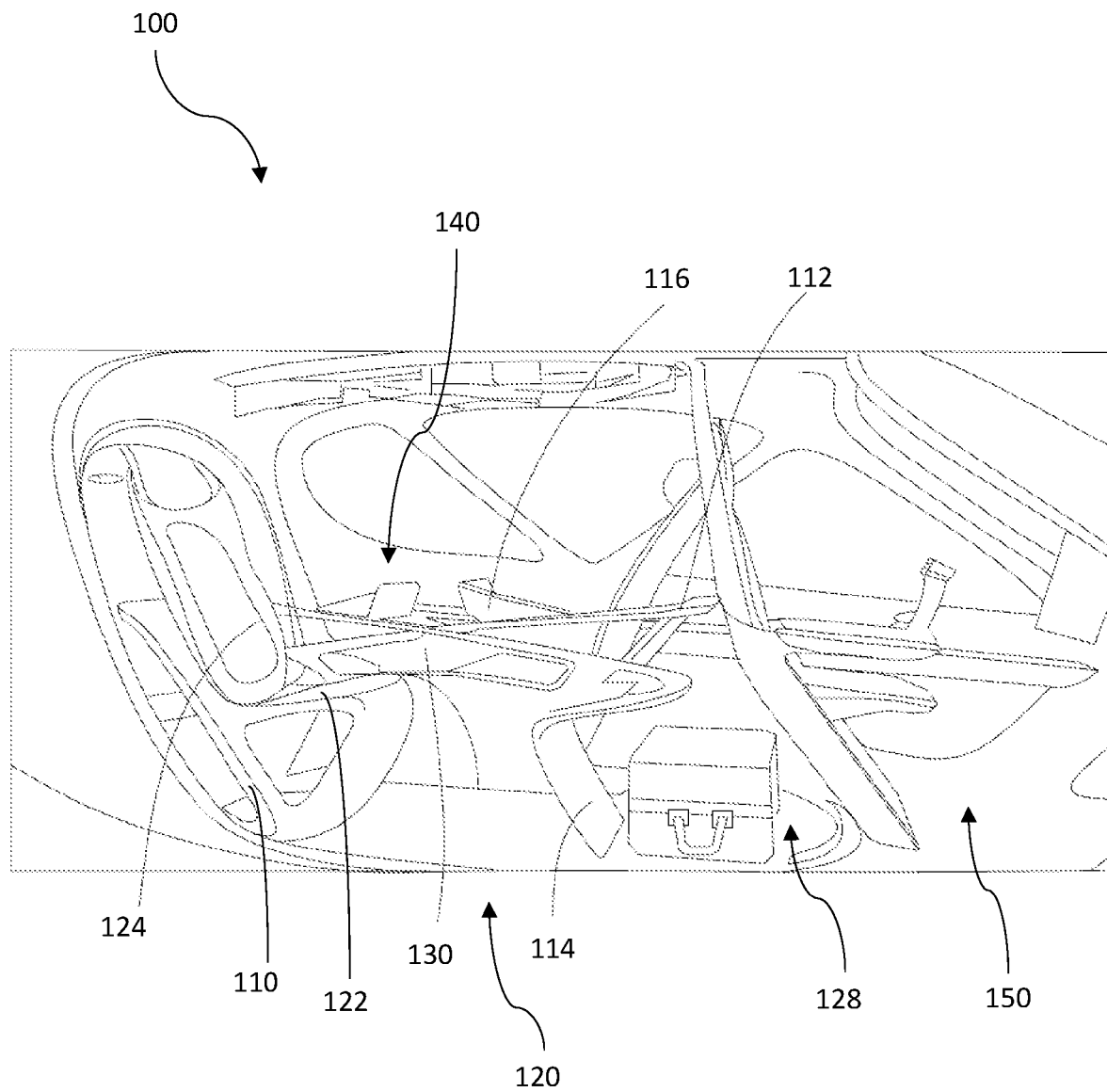
FIG. 1A illustrates a perspective view of an exemplary seating assembly according to an embodiment of the present invention.
Figure 1B:
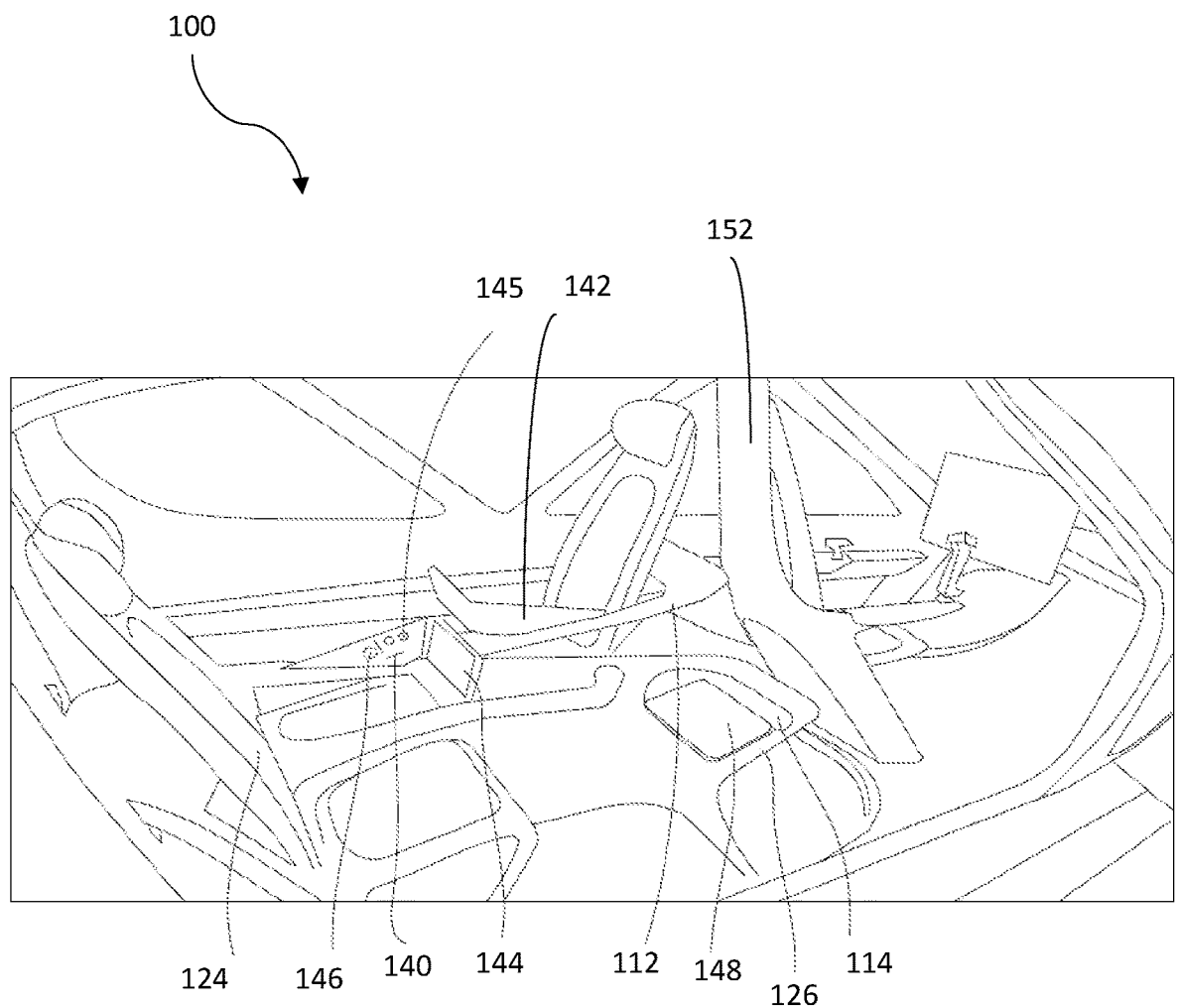
FIG. 1B illustrates a second perspective view of the exemplary seating assembly of FIG. 1A according to an embodiment of the present invention.

As illustrated by FIGS. 1A and 1B, the present disclosure describes a seating assembly 100 that includes a frame 110, the frame including a rear support 112, a front support 114, and a side support 116. The frame 110 may include an elastic netting 160 stretched over the frame 110. The seating assembly 100 includes at least two passenger seating areas 120, the passenger seating areas 120 including a horizontal seating surface 122 disposed on the rear support 112, a vertical support surface 124 disposed on the rear support 112, a console 140 disposed on the side support 116, a footrest 126 disposed on the front support 114, and a storage area 128 positioned in front of the front support 114 and under the footrest 126. The seating assembly 100 includes a divider 130 positioned between the at least two passenger seating areas 120. In front of the passenger seating areas 120, the seating assembly 100 includes an operator seating area 150 and an operator divider 152 positioned between the at least two passenger seating areas 120 and the operator seating area 150. The operator divider 152 provides privacy for each of the seating areas.

In some embodiments, the elastic netting stretched over the frame of the seating assembly may be a tightly woven elastic netting, providing adequate support for a passenger while minimizing the weight of the seating assembly, while still allowing a passenger to see through the elastic netting. Advantageously, an elastic netting that allows a passenger to see through the elastic netting may help passengers remember their belongings that may be stowed underneath the footrest of the seating assembly.

In some embodiments, the passenger divider may also be made from an elastic netting stretched over the frame. In other embodiments, the passenger divider may be made from a lightweight, solid material, such as a type of plastic or lightweight metal alloy. In some embodiments, the operator divider may be made from an elastic netting, allowing the operator and the passengers to see each other through the divider. In other embodiments, the operator divider may be made from a lightweight, solid material, providing privacy between the passenger seating areas and the operator seating area, while still minimizing the weight of the seating assembly.

As illustrated in FIG. 1B, the console 140 may include an armrest 142, a digital screen 144, an electronic docking area 146, or any combination thereof. The digital screen 144 may be coupled to an electronic device 145. In some embodiments, the electronic device 145 may include a biomimetic sensor. The console 126 can further include electrical outlets, control buttons, or any other common feature of a seating console known in the art. In some embodiments, the digital screen 144 can be controlled by a touchscreen, a remote-control device (e.g., a user's mobile device), or a panel of buttons. The armrest 142 may include a padded top surface 148. Similarly, the footrest 128 may include a padded top surface 148.

In some embodiments, the armrest 142 can be adjustable, either manually or electronically.

Although the seating assembly 100 is illustrated having the passenger seating areas positioned such that two passengers sitting in the passenger seating areas would be facing each other, in other embodiments, the passenger seating areas can be configured such that passengers would be facing in the same direction. In some embodiments, passengers may sit with their backs to the operator seating area. In other embodiments, passengers may sit facing the operator seating area.

In some embodiments, the passenger divider may further include an arm rest that forms an L-shared structure behind each respective passenger seating area and a docking station to dock an appropriate electronic device. Naturally, the user(s) and/or passenger(s) may indeed dock a plethora of electronic devices in the docking station wherein such electronic devices may include, but are not limited to, a phone, tablet, and/or laptop. The docking device may further entail an electric outlet, a USB outlet, and/or a headphone inlet to provide the user(s) and/or passenger(s) with access to amenities and/or an electronic charging station. Alternatively, the electronic device may be a device and/or screen that provides on-screen entertainment and/or streaming service wherein such on-screen entertainment and/or streaming service may be access via an authentication mechanism that authenticates the user(s) and/or passenger(s) wherein such an authentication mechanism may be a biomimetic fingerprint sensor, among other biomimetic sensors.

In some embodiments, the footrest may be an ottoman which may be contiguous with the passenger divider. Additionally, the ottoman may be shaped so that room is created below it to allow for the storing of various user and/or passenger belongings. Moreover, the ottoman may further comprise a padding or a built-in padding in the elastically netted surface that provides the user(s) and/or passenger(s) with an added level of comfort. Moreover, this padding may be surrounded, enclosed, and/or engulfed by a visibility netting. The visibility netting allows the user(s) and/or passenger(s) to view his or her belonging(s) and/or object(s) stowed under the ottoman to ensure safeguarding. Moreover, such a visibility netting acts as a memory aid to ensure that the passenger's and/or user's belonging(s) are not left stowed under the ottoman after the passenger(s) and/or user(s) departs the seat arrangement. Also, the visibility netting enhances security and routine security checks by providing and ensuring transparency and visibility.

As illustrated in FIG. 2A, in an example embodiment, a configuration 200a of a seating assembly 200 includes a first passenger seating area 210, a second passenger seating area 220, and an operator seating area 230. In some embodiments, the configuration 200a is a configuration of the seating assembly 100 from FIGS. 1A and 1B. The first passenger seating area 210 includes a first passenger seat 212 and a first passenger footrest 214. The second passenger seating area 220 also includes a second passenger seat 222 and a second passenger footrest 224. The first passenger seating area 210 and the second passenger seating area 220 are separated by a passenger divider 240. The passenger seating areas 210, 220 are separated from the operator seating area 230 by an operator divider 250.

In the illustrated configuration 200a, the first passenger seat 212 is positioned on an opposite side from the second passenger seat 214 so that a passenger sitting in the first passenger seat 212 would be facing a passenger sitting in the second passenger seat 212. Additionally, in the illustrated configuration 200a, the first passenger footrest 214 and the second passenger footrest 224 are configured to be smaller in area than the first passenger seat 212 and the second passenger seat 222. Therefore, in the illustrated configuration 200a a passenger would have more room about their seat than around their feet. As such, the passenger divider 240 may be arranged at an angle relative to a centerline C from the first passenger seat 212 to the second passenger seat 214. This may be considered a yin, yang arrangement. Such a yin and yang arrangement allows for a reclined, relaxed, and comfortable seating position for the user(s) and/or passenger(s). For instance, the user(s) and or passenger(s) may maintain a 'pool deck chair' position wherein the legs are straight, and the torso may be upright but inclined—providing for maximum comfort to the user(s) and/or passenger(s). Note that the seat arrangement may comprise a privacy divider. Privacy divider may follow the division between passenger seatings to allow for space for each passenger to move freely and comfortably in their own space, without needing to share the space with another passenger.

In another configuration 200b, as illustrated in FIG. 2B, the first passenger seat 212 and the first passenger footrest 214 and the second passenger seat 222 and the second passenger footrest 224 have similar areas so that a passenger would have similar amounts of space around their seat and around their feet. Additionally, in the illustrated configuration 200b, the passenger divider 240 is arranged along the centerline C. Although in the illustrated configuration 200b, the first passenger seat 212 is aligned with the second passenger footrest 224 and the second passenger seat 222 is aligned with the first passenger footrest 214 such that passengers would be facing each other, in other configurations, the first passenger seat 212 and the second passenger seat 222 may be arranged so that passengers would be facing the same direction.

In another configuration 200c, as illustrated in FIG. 2C, the first passenger seat 212 and the second passenger seat 222 are configured similarly to configuration 200a. Unlike in configuration 200a and configuration 200b, in the configuration 200c, the operator divider 250 is curved, encompassing the operator seating area 230. The operator seating area 230 includes an operator seating apparatus 232, operator controls and instruments 234, and at least one display 236 coupled to the operator controls and instruments 234.

Depending on the vehicle application, a curved operator divider may allow more space for user(s) and/or passenger(s). A curved operator divider may also advantageously reduce noise from passengers to an operator's area or vice versa.

FIG. 3A illustrates an example seating configuration 300a according to an example embodiment. The seating configuration 300a may be utilized in a vehicle, such as an aerial vehicle (e.g., an airplane, an unmanned aircraft, a drone, a hot air balloon), a land vehicle (e.g., a car, an autonomous car, a bus), or a water vehicle (e.g., a boat, a submersible). The seating configuration 300a includes seating areas 302, 304, 306, 308, and 310 arranged in an arrangement with respect to a centerline C. In the seating configuration 300a, the seating areas 302, 304, 306, and 308 are each arranged at a respective angle from the centerline C while the seating area 310 is positioned along the centerline C. In some embodiments, seating areas 302, 304, 306, 308 are passenger seating areas and seating area 310 is an operator seating area. In other embodiments, the vehicle may not require an operator (e.g., an autonomous car or aircraft), and therefore seating area 310 may additionally be a passenger seating area. In some embodiments, the seating areas 302, 304, 306, 308, and 310 may have any combination of features from the seating assemblies described in FIG. 1A-B and FIGS. 2A-2C.

FIG. 3B illustrates an example seating configuration 300b according to an example embodiment. The seating configuration 300b may be utilized in a vehicle, such as an aerial vehicle (e.g., an airplane, an unmanned aircraft, a drone, a hot air balloon), a land vehicle (e.g., a car, an autonomous car, a bus), or a water vehicle (e.g., a boat, a submersible). The seating configuration 300b includes seating areas 302, 304, 306, 308, and 310 arranged in an arrangement with respect to a centerline C. In the seating configuration 300b, the seating areas 302, 304, 306, and 308 are each arranged at a respective angle from the centerline C while the seating area 310 is positioned along the centerline C.

FIG. 3C illustrates an example seating configuration 300c according to an example embodiment. The seating configuration 300c may be utilized in a vehicle, such as an aerial vehicle (e.g., an airplane, an unmanned aircraft, a drone, a hot air balloon), a land vehicle (e.g., a car, an autonomous car, a bus), or a water vehicle (e.g., a boat, a submersible). The seating configuration 300c includes seating areas 302, 304, 306, 308, 310, and 312 arranged in an arrangement with respect to a centerline C. In the seating configuration 300c, the seating areas 302, 304, 306, 308, 310, and 312 are each arranged at a respective angle from the centerline C. In some embodiments, any of the seating areas 302, 304, 306, 308, 310, and 312 may be arranged at any suitable angle from the centerline C.

FIG. 4 illustrates an example seating configuration 400 according to an example embodiment. The seating configuration 400 includes seating areas 402, 404, 406, 408, and 410, a baggage stowing area 420, and a privacy divider 430 positioned respective to a centerline C. In some embodiments, the seating area 410 may be an operator seating area. In some embodiments, the seating areas 402, 404, 406, 408, and 410 may each be arranged at a different angle respective to the centerline C.

FIG. 5A illustrates an example seating configuration 500a according to an example embodiment. The seating configuration 500a includes passenger seating areas 502, 504, 506, 508, and 510, a center console 520, and an operator seating 530, all configured and positioned about a centerline C. The seating configuration 500a further includes operator controls 532, operator instrument monitors 534, and operator displays 536. The center console 520 may include an armrest, entertainment center, and/or charging ports, etc. Further, the seating configuration 500a includes storage 540.

FIG. 5B illustrates an example seating configuration 500b according to an example embodiment. The seating configuration 500b includes passenger seating areas 502, 504, 506, 508, 510, 512, an operator seating 530, operator controls 532, operator instrument monitors 534, and operator displays 536. The passenger seating areas 502, 504, 506, 508, 510, 512 and operator seating 530 are configured and positioned around the centerline C. Further, the seating configuration 500b includes storage 540.

As illustrated in FIG. 6, the present disclosure discloses an aerial vehicle 600 having a body 610, a plurality of wings 620 extending from the body 610, a plurality of rotors 630 extending from the body 610, a tail 640 extending from the body 610, and a plurality of wheel hubs 650 extending from the body 610. The body 610 includes a cabin 612 which contains a seating assembly 614. In some embodiments, the seating assembly 614 is the same as any seating assembly shown and described in FIGS. 1A, 1B, 2A, 2B, and 2C. Further, in some embodiments, the aerial vehicle 600 may have any seating configuration shown and described in FIGS. 3A, 3B, 3C, 4, 5A, and 5B.

In some embodiments, the present disclosure discloses a seating assembly including a frame, the frame including two rear supports, two side supports, and two front supports, two passenger seating areas, each passenger seating area including a horizontal seating surface and a vertical seating surface disposed on a respective rear support, a console disposed on a respective side support, and a footrest surface disposed on a respective front support, and a divider positioned between the two passenger seating areas.

In some embodiments the seating assembly further includes an operator seating area.

In some embodiments, the seating assembly further includes a second divider, the second divider positioned between the two passenger seating areas and the operator seating area.

In some embodiments, the frame of the seating assembly further includes an elastic netting stretched over the frame.

In some embodiments, the console includes at least one of an arm rest, a digital screen, and an electronic docking area.

In some embodiments, the arm rest of the console includes a padded top surface.

In some embodiments, the footrest surface includes a padded top surface.

In some embodiments, the seating assembly further includes a storage area positioned below the footrest surface.

In some embodiments, the vertical support surface is configured to recline.

In some embodiments, the console further includes an electronic device coupled to the display screen, the electronic device comprising a biomimetic sensor.

In some embodiments, the present invention discloses a seating assembly for a vehicle, the seating assembly including a passenger seating assembly including a frame the frame including two rear supports, two side supports, and two front supports, at least two passenger seating areas, each passenger seating area including a horizontal seating surface and a vertical seating surface disposed on a respective rear support, a console disposed on a respective side support, and a footrest surface disposed on a respective front support, and a passenger divider positioned between the at least two passenger seating areas, an operator seating area, and an operator divider disposed between the at least two passenger seating areas and the operator seating area.

In some embodiments, the passenger seating assembly further includes an elastic netting stretched over the frame.

In some embodiments, each passenger seating area further includes a storage area positioned under the footrest surface.

In some embodiments, the at least two passenger seating areas are positioned such that the rear support of the first passenger seating area is disposed on an opposite side of the seating assembly from the rear support of the second passenger seating area.

In some embodiments, the at least two passenger seating areas are positioned such that the rear support of the first passenger seating area is aligned with the rear support of the second passenger seating area.

In some embodiments of the seating assembly for a vehicle, the console includes at least one of an arm rest, a digital screen, and an electronic docking area.

In some embodiments of the seating assembly for a vehicle, the vertical seating surface reclines.

In some embodiments, the seating assembly for a vehicle further includes a plurality of passenger seating assemblies.

In some embodiments, the present invention discloses an aerial vehicle including a body, a plurality of wings extending from the body, a plurality of rotors, and a tail. In such embodiments, the body includes a cabin containing a seating assembly, the seating assembly including a frame comprised of two rear supports, two side supports, and two front supports, two passenger seating areas, each passenger seating area including a horizontal seating surface and a vertical seating surface disposed on a respective rear support, a console disposed on a respective side support, and a footrest surface disposed on a respective front support, and a divider positioned between the two passenger seating areas.

In some embodiments, the cabin of the aerial vehicle further includes an operator seating area, the operator seating area including a seating apparatus, operator controls and instruments, and at least one monitor or display coupled to the operator controls and instruments.

The present disclosure describes various features and operations of the disclosed systems. The illustrative implementations described herein are not meant to be limiting. Certain aspects of the disclosed systems can be arranged and combined in a variety of different configurations, all of which are contemplated herein.

According to another embodiment, a seat for a vehicle may be contemplated wherein the seat may comprise at least two passenger seatings, a privacy divider located between the at least two passenger seatings wherein the privacy divider may further comprise an arm rest and a docking station for electronic devices, an ottoman contiguous with the privacy divider wherein the ottoman may further comprise a padding and a visibility netting, an operator seating, and a dividing wall between the at least two passenger seatings and the operator seating.

In another aspect, the arm rest may form an L-shaped structure behind each passenger seating wherein the arm rest may be an elastically netted surface. In a further aspect, the privacy divider and the ottoman may be an elastically netted surface.

Further, unless context suggests otherwise, the features illustrated in each of the figures may be used separately or in combination. Thus, the figures should be generally viewed as component aspects of one or more overall implementations, with the understanding that not all illustrated features are necessary for each implementation.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting. Also, the terminology used herein is for the purpose of describing particular implementations only and is not intended to be limiting.

The invention claimed is:

1. A seating assembly comprising:
   a frame comprising two rear supports, two side supports, and two front supports;
   two passenger seating areas, each passenger seating area comprising a horizontal seating surface and a vertical seating surface disposed on and supported by a respective rear support of the frame, a console disposed on a respective side support, and a footrest surface disposed on a respective front support;
   a divider positioned between the two passenger seating areas, and
   an arm rest forming an L-shaped structure defined by a portion of the divider and a portion of the respective rear support, wherein the L-shaped structure extends behind each respective passenger seating area.

2. The seating assembly of claim 1 further comprising an operator seating area.

3. The seating assembly of claim 2 further comprising a second divider, the second divider positioned between the two passenger seating areas and the operator seating area.

4. The seating assembly of claim 1, wherein the frame further comprises an elastic netting stretched over the frame.

5. The seating assembly of claim 1, wherein the console comprises at least one of a digital screen and an electronic docking area.

6. The seating assembly of claim 1, wherein the footrest surface comprises a padded top surface.

7. The seating assembly of claim 1 further comprising a storage area positioned below the footrest surface.

8. The seating assembly of claim 1, wherein the vertical seating surface is configured to recline.

9. A seating assembly for a vehicle, the seating assembly comprising:
   a passenger seating assembly comprising:
      a frame comprising two rear supports, two side supports, and two front supports;
      at least two passenger seating areas, each passenger seating area comprising a horizontal seating surface and a vertical seating surface disposed on and supported by a respective rear support of the frame, a console disposed on a respective side support, and a footrest surface disposed on a respective front support;
      a passenger divider positioned between the at least two passenger seating areas, and
      an arm rest forming an L-shaped structure defined by a portion of the passenger divider and a portion of the respective rear support, wherein the L-shaped structure extends behind each respective passenger seating area;
   an operator seating area; and
   an operator divider disposed between the at least two passenger seating areas and the operator seating area.

10. The seating assembly of claim 9, wherein the passenger seating assembly further comprises an elastic netting stretched over the frame.

11. The seating assembly of claim 9, wherein each passenger seating area further comprises a storage area positioned under the footrest surface.

12. The seating assembly of claim 9, wherein the at least two passenger seating areas are positioned such that the rear support of a first passenger seating area is disposed on an opposite side of the seating assembly from the rear support of a second passenger seating area.

13. The seating assembly of claim 9, wherein the at least two passenger seating areas are positioned such that the rear support of a first passenger seating area is aligned with the rear support of a second passenger seating area.

14. The seating assembly of claim 9, wherein the console comprises at least one of a digital screen and an electronic docking area.

15. The seating assembly of claim 9, wherein the vertical seating surface reclines.

16. The seating assembly of claim 9 further comprising a plurality of passenger seating assemblies.

17. An aerial vehicle comprising:
   a body comprising:
      a cabin comprising a seating assembly, the seating assembly comprising:
         a frame comprising two rear supports, two side supports, and two front supports;
         two passenger seating areas, each passenger seating area comprising a horizontal seating surface and a vertical seating surface disposed on and supported by a respective rear support of the frame, a console disposed on a respective side support, and a footrest surface disposed on a respective front support; and
         a divider positioned between the two passenger seating areas, wherein the divider is arranged at an angle to a centerline of the aerial vehicle between a first passenger seating area and a second passenger seating area, and wherein the divider extends from an operator seating area to a rear end of the cabin;
   a plurality of wings extending from the body;
   a plurality of rotors; and
   a tail.

18. The aerial vehicle of claim 17, wherein the cabin further comprises an operator seating area, the operator seating area comprising a seating apparatus, operator controls and instruments, and at least one monitor or display coupled to the operator controls and instruments.

19. The aerial vehicle of claim 18, further comprising a second divider positioned between the operator seating area and the two passenger seating areas, and wherein the second divider is curved.

* * * * *